(12) United States Patent
Kramer (10) Patent No.: US 8,089,880 B2
(45) Date of Patent: Jan. 3, 2012

(54) NETWORK RELAY HAVING DYNAMICALLY SELECTABLE RECEIVE AND TRANSMIT CHANNEL INTERVALS AND METHOD OF OPERATING THE SAME

(75) Inventor: Gerhard G. T. Kramer, Chatham, NJ (US)

(73) Assignee: Alcatel Lucent, Paris (FR)

( * ) Notice: Subject to any disclaimer, the term of this patent is extended or adjusted under 35 U.S.C. 154(b) by 762 days.

(21) Appl. No.: 11/222,476

(22) Filed: Sep. 8, 2005

(65) Prior Publication Data

US 2007/0053134 A1    Mar. 8, 2007

(51) Int. Cl.
*H04L 1/00*    (2006.01)
(52) U.S. Cl. .................. 370/235; 370/345; 370/498
(58) Field of Classification Search .................. 370/345, 370/498
See application file for complete search history.

(56) References Cited

U.S. PATENT DOCUMENTS

| | | | | |
|---|---|---|---|---|
| 5,659,761 | A * | 8/1997 | DeArras et al. | 713/300 |
| 6,018,520 | A * | 1/2000 | Okada | 370/336 |
| 6,292,517 | B1 * | 9/2001 | Jeffress et al. | 375/287 |
| 2004/0233849 | A1 * | 11/2004 | Cole | 370/238 |
| 2005/0002375 | A1 * | 1/2005 | Gokhale et al. | 370/347 |
| 2007/0053134 | A1 * | 3/2007 | Kramer | 361/160 |

OTHER PUBLICATIONS

Kramer, et al; "Capacity Theorems for Wireless Relay Channels;" Proc. 41st Annu. Allerton Conference on Communication, Control, and Computing, (Monticello, IL), Oct. 1-3, 2003, pp. 1074-1083.
Kramer, et al; "Cooperative Strategies and Capacity Theorems for Relay Networks;" IEEE Trans. Inform. Theory, Submitted Feb. 2004.
Gastpar, et al; "On the Capacity of Large Gaussian Relay Networks;" Proc. IEEE Infocom 2002, New York, Jun. 2002.
Host-Madsen; "On the Capacity of Wireless Relaying;" Proc. IEEE Vehic. Techn. Conference, VTC 2002 Fall, (Vancouver, BC), vol. 3, pp. 1333-1337, Sep. 24-28, 2002.
Khojastepour, et al; "On the Capacity of 'Cheap' Relay Networks;" Proc. 37th Annu. Conference on Information Sciences and Systems (CISS), (Baltimore, MD), Mar. 12-14, 2003.
Nabar, et al; "Capacity Scaling Laws in MIMO Wireless Networks;" Proc. 41st Annu. Allerton Conference on Communication, Control, and Computing, (Monticello, IL), Oct. 1-3, 2003, pp. 378-389.
Cover, et al; "Capacity Theorems for the Relay Channel;" IEEE Trans. Inform. Theory, vol. 25, pp. 572-584, Sep. 1979.

(Continued)

*Primary Examiner* — Jianye Wu
(74) *Attorney, Agent, or Firm* — Hitt Gaines, PC (57) ABSTRACT

A network relay, a transmitter and methods of operating a network relay and transmitter. In one embodiment, the method of operating the network relay includes: (1) at a relay, receiving one or more symbols transmitted by a source in each of a first sequence of fundamental intervals, (2) from the relay, transmitting data extracted from the received ones of the symbols to a destination in each of a second sequence of fundamental intervals, the fundamental intervals of the first and second sequences interleaving to make a continuous period of time and (3) for each particular one of the fundamental intervals, selecting between performing the receiving and performing the transmitting based on one or more of the symbols received in an associated recent one of the fundamental intervals.

20 Claims, 4 Drawing Sheets

OTHER PUBLICATIONS

El Gamal, et al; "The Capacity of the Semideterministic Relay Channel;" IEEE Trans. Inform. Theory, vol. 28, p. 536, May 1982.

Wang, et al; "On the Ergodic Capacity of MIMO Relay Channel;" Proc. 38th Annu. Conference on Information Sciences and Systems (CISS), (Princeton, NJ), Mar. 17-19, 2004.

Sankaranarayanan, et al; "Hierarchical Sensor Networks: Capacity Bounds and Cooperative Strategies Using the Multiple-Access Relay Channel Model," Proc. 1st Annu. IEEE Conf. on Sensor and Ad Hoc Communication and Networks (SECON '04), (Santa Clara, CA), Oct. 4-7, 2004.

Laneman; "Cooperative Diversity in Wireless Networks: Algorithms and Architectures;" Ph.D. Dissertation, MIT, Cambridge, MA, 2002, Ch. 5.

* cited by examiner

NETWORK RELAY HAVING DYNAMICALLY SELECTABLE RECEIVE AND TRANSMIT CHANNEL INTERVALS AND METHOD OF OPERATING THE SAME

TECHNICAL FIELD OF THE INVENTION

The present invention is directed, in general, to network relays for wireless and wireline communications networks and, more specifically, to a network relay having dynamically selectable receive and transmit channel intervals and a method of operating the same.

BACKGROUND OF THE INVENTION

Presently, multi-hop (or "decode-and-forward") wireless transmission systems, e.g., adhering to the well-known IEEE 802.11 standard, often include "passive" relays in the paths between source terminals and destination terminals. The relays serve to increase the effective length of the paths within the transmission systems by retransmitting symbols received from the source terminals to the destination terminals.

Some relays, often referred to as sleep-listen-or-talk, or "SLoT," relays, are unable to receive and retransmit simultaneously. Such relays are therefore unavailable to receive symbols while they are transmitting. SLoT relays and their corresponding destination terminals negotiate to determine the intervals during which they receive and also the intervals during which they transmit. Since the designation of an interval as a transmit interval or a receive interval is fixed ahead of time, such relays are said to be carrying out a fixed SLoT strategy. Unfortunately, fixed SLoT strategies are unable to achieve the capacity of a wireless relay channel.

It is known that multi-hopping, or decode-and-forward, achieves the capacity of wireless relay channels if the relay is near the source terminal and if the channel phase is "random" and known only locally (see, e.g., Kramer, et al., "Capacity Theorems for Wireless Relay Channels," Proc. 41st Annu. Allerton Conf. on Communication, Control, and Computing, (Monticello, Ill.), pp. 1074-1083, Oct. 1-3, 2003. ("Random" as used in this art means chaotic and not necessarily mathematically random.)

This capacity result is also valid if the relay cannot transmit and receive at the same time, as long as the destination knows the source and relay operating modes, and the fraction of time the relay listens to the source is lower bounded by a positive number (see, e.g., Kramer, et al., "Cooperative Strategies and Capacity Theorems for Relay Networks," IEEE Trans. Inform. Theory, submitted February 2004). The latter situation occurs, e.g., when protocols or energy constraints restrict the amount of time the relay can transmit.

Some information theory for relays that cannot receive and transmit simultaneously has already been developed (see, e.g., Gastpar, et al., "On the Capacity of Large Gaussian Relay Networks," Proc. IEEE Infocom 2002, New York, June 2002; Høst-Madsen, "On the Capacity of Wireless Relaying," Proc. IEEE Vehic. Techn. Conf, VTC 2002 Fall, (Vancouver, BC), vol. 3, pp. 1333-1337, Sep. 24-28, 2002; Khojastepour, et al., "On the Capacity of 'Cheap' Relay Networks," Proc. 37th Annu. Conf. on Information Sciences and Systems (CISS), (Baltimore, Md.), Mar. 12-14, 2003; and Nabar, et al., "Capacity Scaling Laws in MIMO Wireless Networks," Proc. 41st Annu. Allerton Conf. on Communication, Control, and Computing, (Monticello, Ill.), pp. 378-389, Oct. 1-3, 2003 and references therein). Unfortunately, all of the theory developed to date has assumed a fixed SLoT strategy, i.e., all terminals know at all times which mode (receive or transmit) every terminal is using.

What is needed in the art is an extension of information theory to relays and transmitters capable of carrying out a random SLoT strategy. What is further needed in the art is an extension of information theory to channels that are memoryless and with cost constraints. What is still further needed in the art is an extension of information theory to SLoT relays. Ultimately, what is needed in the art are relays and methods of operating a transmitter that increase channel utilization in both wireless and wireline communications networks.

SUMMARY OF THE INVENTION

To address the above-discussed deficiencies of the prior art, the present invention provides a method of operating a network relay. In one embodiment, the method of operating the network relay includes: (1) at a relay, receiving one or more symbols transmitted by a source in each of a first sequence of fundamental intervals, (2) from the relay, transmitting data extracted from the received ones of the symbols to a destination in each of a second sequence of fundamental intervals, the fundamental intervals of the first and second sequences interleaving to make a continuous period of time and (3) for each particular one of the fundamental intervals, selecting between performing the receiving and performing the transmitting based on one or more of the symbols received in an associated recent one of the fundamental intervals.

In another aspect, the present invention provides a method of operating a transmitter. In one embodiment, the method includes: (1) during a first sequence of fundamental intervals, transmitting symbols to a relay for transmitting from the relay to a destination, (2) during a second sequence of fundamental intervals, waiting to transmit symbols to the relay, the fundamental intervals of the first and second sequences interleaving to make a continuous period of time and (3) for each particular one of the fundamental intervals, selecting between performing the transmitting and performing the waiting based on one or more of the symbols transmitted in an associated recent one of the fundamental intervals.

In yet another aspect, the present invention provides a sleep-listen-or-talk network relay. In one embodiment, the network relay includes: (1) a receiver configured to receive one or more symbols transmitted by a source in each of a first sequence of fundamental intervals, (2) a transmitter associated with the receiver and configured to transmit data extracted from the received ones of the symbols to a destination in each of a second sequence of fundamental intervals, the fundamental intervals of the first and second sequences interleaving to make a continuous period of time and (3) a mode selector associated with the receiver and the transmitter and configured to select, for each particular one of the fundamental intervals, between activating the receiver and activating the transmitter based on one or more of the symbols received in an associated recent one of the fundamental intervals.

In still another aspect, the present invention provides a transmitter. In one embodiment, the transmitter is configured to: (1) during a first sequence of fundamental intervals, transmit symbols to a relay for transmitting from the relay to a destination, (2) during a second sequence of fundamental intervals, wait to transmit symbols to the relay, the fundamental intervals of the first and second sequences interleaving to make a continuous period of time and (3) for each particular one of the fundamental intervals, select between performing the transmitting and performing the waiting based on one or more of the symbols transmitted in an associated recent one of the fundamental intervals.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

First, a suitable communication model will be defined and some of its subtleties discussed. Then, capacity upper and lower bounds obtained from information theory will be reviewed. The lower bounds are based on the decode-and-forward (DF) strategy of Theorem 1 of Cover, et al., "Capacity Theorems for the Relay Channel" IEEE Trans. Inform. Theory, vol. 25, pp. 572-584, September 1979, and the partial-decode-and-forward (PDF) strategy of Theorem 7 of Cover, et al., "Capacity Theorems . . . ," supra, or El Gamal, et al., "The Capacity of the Semideterministic Relay Channel," IEEE Trans. Inform. Theory, vol. 28, p. 536, May 1982. Several examples of SLoT constraints will be considered, and cases where the DF strategy achieves capacity will be described. Then, symbol synchronization between the transmitters will be discussed. Finally, apparatus and methods capable of accommodating dynamically selectable receive and transmit channel intervals will be described.

A relay channel (see, e.g., Cover, et al., "Capacity Theorems . . . ," supra) has three terminals numbered t=1, 2, 3, a message W, channel inputs $X_{ti}$, t=1, 2, i=1, 2, . . . , n, channel outputs $Y_{ti}$, t=2, 3, i=1, 2, . . . , n and a message estimate $\hat{W}$. The source (terminal 1) transmits the sequence $X_1^n = X_1, X_2, \ldots, X_n$ that is a function of W. The relay (terminal 2) input $X_{2i}$ is a function of the past outputs $Y_2^{i-1}$ for i=1, 2, . . . , n. The destination (terminal 3) computes $\hat{W}$ as a function of $Y_3^n$. For a memoryless channel, the joint probability distribution of the random variables W, $X_1^n$, $X_2^n$, $Y_2^n$, $Y_3^n$, $\hat{W}$ thus factors as:

$$P_W(w)I(X_1^n = x_1^n(w)) \left[ \prod_{i=1}^n \frac{I(X_{2i} = x_{2i}(y_2^{i-1}))}{P_{Y_2 Y_3 | X_1 X_2} (y_{2i}, y_{3i} | x_{1i}, x_{2i})} \right] I(\hat{W} = \hat{w}(y_3^n)) \quad (1)$$

where $P_W(\cdot)$ is the probability distribution of the random variable W, $I(\cdot)$ is the indicator function that assumes a value of one if its argument is true, and zero otherwise. Suppose H(W)=B bits so the data rate is R=B/n bits per channel use. The capacity C is the supremum of rates for which one can achieve $Pr(\hat{W} \neq W) \leq \epsilon$ for any positive $\epsilon$. This model is general in that it applies to both wireline and wireless networks. Now, the model will be specialized to wireless Gaussian networks.

Each terminal t is modeled as operating in one of three modes: sleep (S), listen (L) or talk (T). The terminal transmits $X_{ti}=0$ if it is in mode S or L, and receives $Y_{ti}=0$ if it is in mode S or T. The channel inputs are considered to be vectors $\underline{x}_{ti}=[m_{ti},x_{ti}]$ with an alphabet:

$$\underline{X} = \{(S,0),(L,0)\} \cup \{\{T\} \times C\} \quad (2)$$

where C is the set of complex numbers. Note that the notation of Equation (1) has been changed such that $x_{ti}$ represents the second component of the input $\underline{x}_{ti}$. This convention will continue to be followed hereinafter. The Gaussian channel outputs are:

$$Y_{ti} = \begin{cases} Z_{ti} + \sum_{s \neq t} \frac{A_{sti}}{d_{st}^{\alpha/2}} X_{si} & \text{if } M_{ti} = L \\ 0 & \text{if } M_{ti} \neq L \end{cases} \quad (3)$$

for t=2, 3, where the $Z_{ti}$ are independent, Gaussian, zero-mean and unit-variance, and have independent and identically distributed (i.i.d.) real and imaginary parts. The number $d_{st}$ represents the distance between terminals s and t, and α is an attenuation exponent. The $A_{sti}$ are fading random variables, and as in Kramer, et al., "Capacity Theorems . . . ," supra, two kinds of fading are considered:

No fading: $A_{sti}=1$ for all s, t, and i.

Phase fading: $A_{sti}=e^{j\theta_{sti}}$ where $\theta_{sti}$ is uniformly distributed over $[0,2\pi)$. The $\theta_{sti}$ are mutually independent and independent of all other random variables.

It will further be assumed that terminal t knows only its own fading coefficients, i.e., terminal t knows $A_{sti}$ for all s and i, but it does not know $A_{st'i}$ for t'≠t. The full channel output of terminal t at time i is thus $\underline{Y}_{ti}=[\underline{A}_{ti},Y_{ti}]$, where $\underline{A}_{ti}$ is the vector of $A_{sti}$ for all s. The following theory also applies to other types of fading models (see, e.g., Kramer, et al., "Cooperative Strategies . . . ," supra; or Wang, et al., "On the Ergodic Capacity of MIMO Relay Channel," Proc. 38th Annu. Conf. on Information Sciences and Systems (CISS), (Princeton, N.J.), pp. 603-608, Mar. 17-19, 2004).

The cost functions $f_t(\underline{x}_t)$ are now introduced on the symbols in $\underline{X}$:

$$f_t(\underline{x}_t) = f_t([m_t, x_t]) = \begin{cases} P_t(S) & \text{if } m_t = S \\ P_t(L) & \text{if } m_t = L \\ |x_t|^2 + P'_t(T) & \text{if } m_t = T. \end{cases} \quad (4)$$

where $P_t(m)$ is the power consumed in mode m, and where $P_t'(T)$ is some constant. One commonly imposes the following average block power constraints:

$$\sum_{i=1}^{n} \frac{1}{n} E[f_t(\underline{X}_{ti})] \leq P_t, \quad (5)$$

$t = 1, 2.$

The constraints of Equation (5) let the source and relay distribute power across modes. However, to avoid having excessive power in any one mode, the following average mode power constraints are added:

$$P_t(m) = \sum_{i:m_{ti}=m} \frac{1}{n_{tm}} E[f_t([m, X_{ti}])] \leq P^*_t, \quad (6)$$

$t = 1, 2,$ $m = S, L, T$ where $P_t \leq P^*_t$ and $n_{tm}$ is the number of times that terminal t uses mode m. For simplicity, $P^*_t$ is chosen to be independent of m. Also, the source will be assumed always to talk with $P_1'(T)=0$, i.e.:

$$P_{m_1}(T) = 1 \quad (7)$$

and $$\sum_{i=1}^{n} \frac{1}{n} E[|X_{1i}|^2] \leq P_1.$$

These constraints allow one to avoid having to optimize $P_{M_1}(\cdot)$. It will further be assumed that the destination always listens, i.e., $P_{M_3}(L)=1$ (and $P_3 \geq P_3(L)$ so the power constraints are satisfied).

Figure 1:
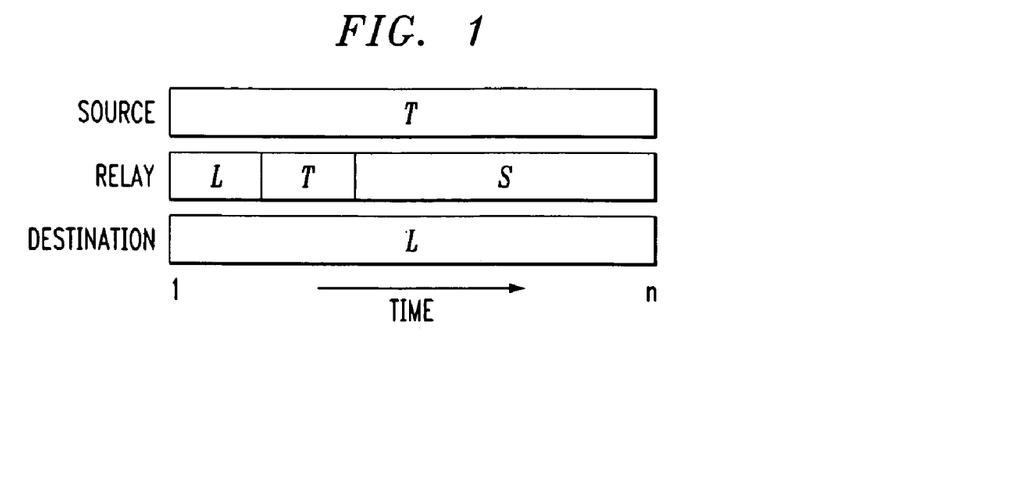
FIG. 1 illustrates a highly schematic diagram of an exemplary fixed SLoT strategy.

A natural coding strategy is to choose a fixed SLoT structure, i.e., to specify ahead of time when every terminal should be in mode S, L or T. Gastpar, et al., supra; Høst-Madsen, supra; Khojastepour, et al., supra; Kramer, et al., "Cooperative Strategies . . . ," supra; and Nabar, et al., supra, take this position. FIG. 1 depicts an example of such a strategy, which is called a "fixed" or "deterministic" SLoT strategy.

Figure 2:
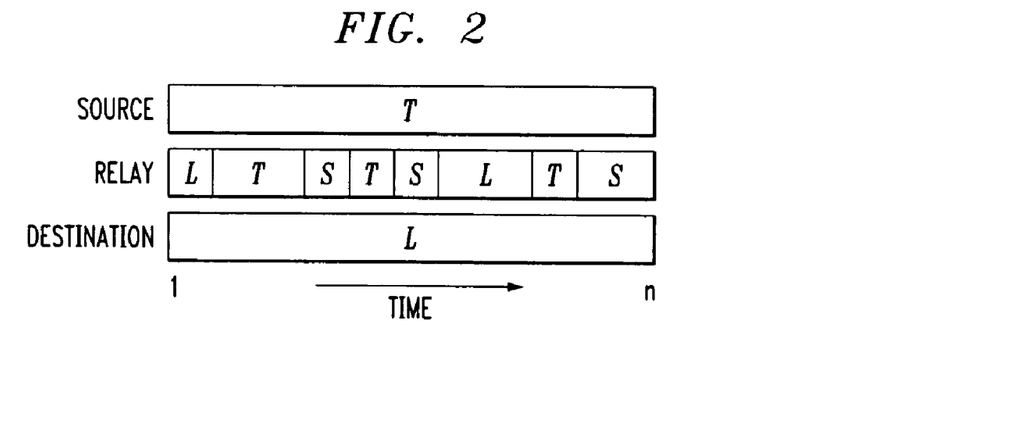
FIG. 2 illustrates a highly schematic diagram of an exemplary random SLoT strategy.

Alternatively, one might choose a dynamic, nondeterministic, or random SLoT strategy as shown in FIG. 2. As will be shown, a random strategy always performs as well as the fixed one, and usually better. For both the fixed and random strategies, the following SLoT constraints seem natural:

terminal t must be in sleep mode S at least a fraction $\beta_t$ of the time, the relay must be in listen mode L at least a fraction $\gamma_2$ of the time, and terminals 1 and 3 never use modes L and T, respectively, i.e., $P_{M_1}(L)=P_{M_3}(T)=0$.

The first constraint models the case where energy is at a premium. The second constraint ensures the relay receives sufficient symbols to permit decoding and coordination. Alternatively, this constraint reflects the fact that protocols sometimes restrict the fraction of time the relay can listen (or talk). The capacity results depend on this constraint, i.e., for $\gamma_2 > 0$ it can sometimes be proven that capacity is achieved. The third constraint is added because the source and destination have no channel output and input, respectively. A large power penalty is sometimes incurred when switching from mode S to modes L or T. For such cases, a hybrid strategy where the destination knows when $M_2=S$ may be appropriate.

The advantage of considering a memoryless model is that all the existing theory on memoryless relay channels can be used. In particular, the cut-set bound set forth on page 445 of Cover, et al., *Elements of Information Theory*, New York: Wiley, 1991, can be applied:

$$C \leq \max_{P_{\underline{X}_1 \underline{X}_2}(\cdot)} \min[I(\underline{X}_1; \underline{Y}_2 \underline{Y}_3 | \underline{X}_2), I(\underline{X}_1 \underline{X}_2; \underline{Y}_3)] = \quad (8)$$

$$\max_{P_{\underline{X}_1 \underline{X}_2}(\cdot)} \min[I(X_1; Y_2 Y_3 | X_2 M_2 A_{12} A_{13} A_{23}), I(X_1 X_2; Y_3 | A_{13} A_{23})].$$

where $[M_1, M_2] - [X_1, X_2] - [\underline{Y}_2, \underline{Y}_3]$ forms a Markov chain. Note that Equation (8) has no power or SLoT constraints associated with it. However, by using the concavity in $P_{\underline{X}_1 \underline{X}_2}(\cdot)$ of the minimum in Equation (8), the following constraints:

$E[f_t(\underline{X}_t)] \leq P_t$, t=1, 2

$E[f_t(m_t, X_t)] \leq P^*_t$, t=1, 2, $m_2$=S, L, T   (9)

can be added to Equation (8). One can similarly show that one can add SLoT constraints to Equation (8), e.g., $P_{M_t}(S) \geq \beta_t$, t=1, 2, 3, $P_{M_2}(L) \geq \gamma_2$ and $P_{M_1}(L) = P_{M_3}(T) = 0$.

Theorem 1 of Cover, et al., "Capacity Theorems . . . ," supra, establishes that the following rate is achievable:

$$R = \max \min[I(\underline{X}_1; \underline{Y}_2 | \underline{X}_2), I(\underline{X}_1 \underline{X}_2; \underline{Y}_3)] = \quad (10)$$

$$\max \min[I(X_1; Y_2 | X_2 M_2 A_{12}), I(X_1 X_2; Y_3 | A_{13} A_{23})]$$

where the maximization is over all $P_{\underline{X}_1 \underline{X}_2}(\cdot)$ satisfying the power and SLoT constraints. The strategy associated with this scheme is called a decode-and-forward strategy, or simply DF.

Suppose next that a fixed SLoT strategy is used. The achievable DF rate can be written as:

$$R_F = \min[I(X_1; Y_2 | X_2 M_1 M_2 A_{12}), I(X_1 X_2; Y_3 | M_1 M_2 A_{13} A_{23})] \quad (11)$$

for some $P_{M_1 M_2}(\cdot) P_{X_1 X_2 | M_1 M_2}(\cdot)$ It is clear that Gaussian $p_{X_1 X_2 | M_1 M_2}(\cdot)$ maximize Equation (11). But if $P_{M_1 M_2}(\cdot) p_{X_1 X_2 | M_1 M_2}(\cdot)$ is used in Equation (10), the following rate is achieved:

$$R_F = \min[I(M_1; Y_2 | X_2 M_2 A_{12}) + I(X_1; Y_2 | X_2 M_1 M_2 A_{12}), \\ I(M_1 M_2; Y_3 | A_{13} A_{23}) + I(X_1 X_2; Y_3 | M_1 M_2 A_{13} A_{23})]. \quad (12)$$

The rate of Equation (12) is at least as large as that of Equation (11), and is usually larger. This means that a random SLoT strategy permits larger rates than the corresponding fixed SLoT strategy. Moreover, one sometimes achieves the largest rates with non-Gaussian $p_{X_1 X_2 | M_1 M_2}(\cdot)$. The reason for the rate gain is that one can send information through the choice of operating modes.

The relay should not only listen, but also talk, which suggests that the relay should sometimes decode only part of the message. This can be accommodated by using Theorem 7 of Cover, et al., "Capacity Theorems . . . ," supra, as in El Gamal, et al., supra, which establishes that the following rate is achievable:

$$R = \max\min[I(Q; Y_2|X_2) + I(X_1; Y_3|QX_2)I(X_1X_2; Y_3)] = \\ \max\min[I(Q; Y_2|X_2M_2A_{12}) + I(X_1; Y_3|QX_2M_2A_{13}A_{23}), \\ I(X_1X_2; Y_3|A_{13}A_{23})] \quad (13)$$

where the maximization is over all $p_{QX_1X_2}(\cdot)$ satisfying the power and SLoT constraints. The strategy associated with this scheme is called a partial-decode-and-forward strategy, or simply PDF. The reason for this choice of name is that the relay is decoding only that part of the message W represented by Q. The PDF strategy was used, e.g., in Theorem 1 of Høst-Madsen, supra, for relay channels and in Sankaranarayanan, et al., "Hierarchical Sensor Networks: Capacity Bounds and Cooperative Strategies Using the Multiple-Access Relay Channel Model," Proc. 1st Annu. IEEE Conf. on Sensor and Ad Hoc Communication and Networks (SECON '04), (Santa Clara, Calif.), Oct. 4-7, 2004, for multi-access relay channels. Such strategies have also been used in, e.g., in Laneman, *Cooperative Diversity in Wireless Networks: Algorithms and Architectures*. Ph.D. Dissertation, MIT, Cambridge, Mass., 2002, Ch. 5. Similar claims as in Equations (11) and (12) can be made when comparing fixed and random SLoT strategies.

Several examples of SLoT constraints will now be considered to illustrate the theory. For simplicity, only strategies with $P_{M_1}(T) = P_{M_3}(L) = 1$ and where the source does not perform power control, will be considered, i.e., the source transmits at power $P_1$ regardless of which mode the relay is using. Further, the geometry shown in FIG. 3 will be considered, i.e., the source is at the origin, and the relay and destination are a distance of d and one to the right of the source, respectively.

Consider a fixed SLoT strategy with no fading. As in Høst-Madsen, supra; Khojastepour, et al., supra; and Kramer, et al., "Capacity Theorems . . . ," supra, for DF it is best to choose Gaussian $X_1$ and $X_2$ when conditioning on $M_1$ and $M_2$.

$$R_F = \min\left[P_{M_2}(L)\log\left(1 + \frac{P_1}{d_{12}^\alpha}\right), (P_{M_2}(S) + P_{M_2}(L))\log\left(1 + \frac{P_1}{d_{13}^\alpha}\right) + \\ P_{M_2}(T)\log\left(1 + \frac{P_1}{d_{12}^\alpha} + \frac{P_2''(T)}{d_{13}^\alpha} + \frac{2\Re(\rho)\sqrt{P_1 P_2''(T)}}{d_{13}^{\alpha/2} d_{23}^{\alpha/2}}\right)\right] \quad (14)$$

is computed, where $\rho = E[X_1 X_2^* | M_2 = T]/\sqrt{P_1 P_2''(T)}$, $\Re(\rho)$ is the real part of $\rho$, and $$P_2''(T) = \min\left[P_2^* \frac{P_2 - P_{M_2}(S)P_2(S) - P_{M_2}(L)P_2(L)}{P_{M_2}(T)}\right] - P_2'(T). \quad (15)$$

One clearly should use $\rho = 1$. Suppose $P_2(S) = P_2(L)$, in which case one should also set $P_{M_2}(S) = \beta_2$ (any $M_2 = S$ symbol should be made an $M_2 = L$ symbol). $P_{M_2}(L)$ is numerically optimized for the following first example.

Example 1

Figure 3:
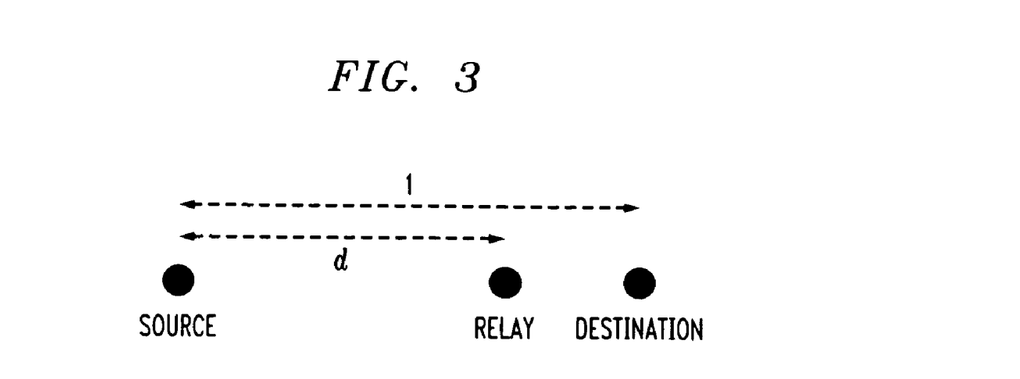
FIG. 3 illustrates a highly schematic diagram of an exemplary geometry for a relay channel.

Consider the geometry of FIG. 3, and suppose the system parameters are:

$$\alpha = 4, P_1 = P_2 = P_2^* = 4, P_2(S) = P_2(L) = P_2'(T) = 0, \beta_2 = 0, \\ \gamma = 0.5. \quad (16)$$

Figure 4:
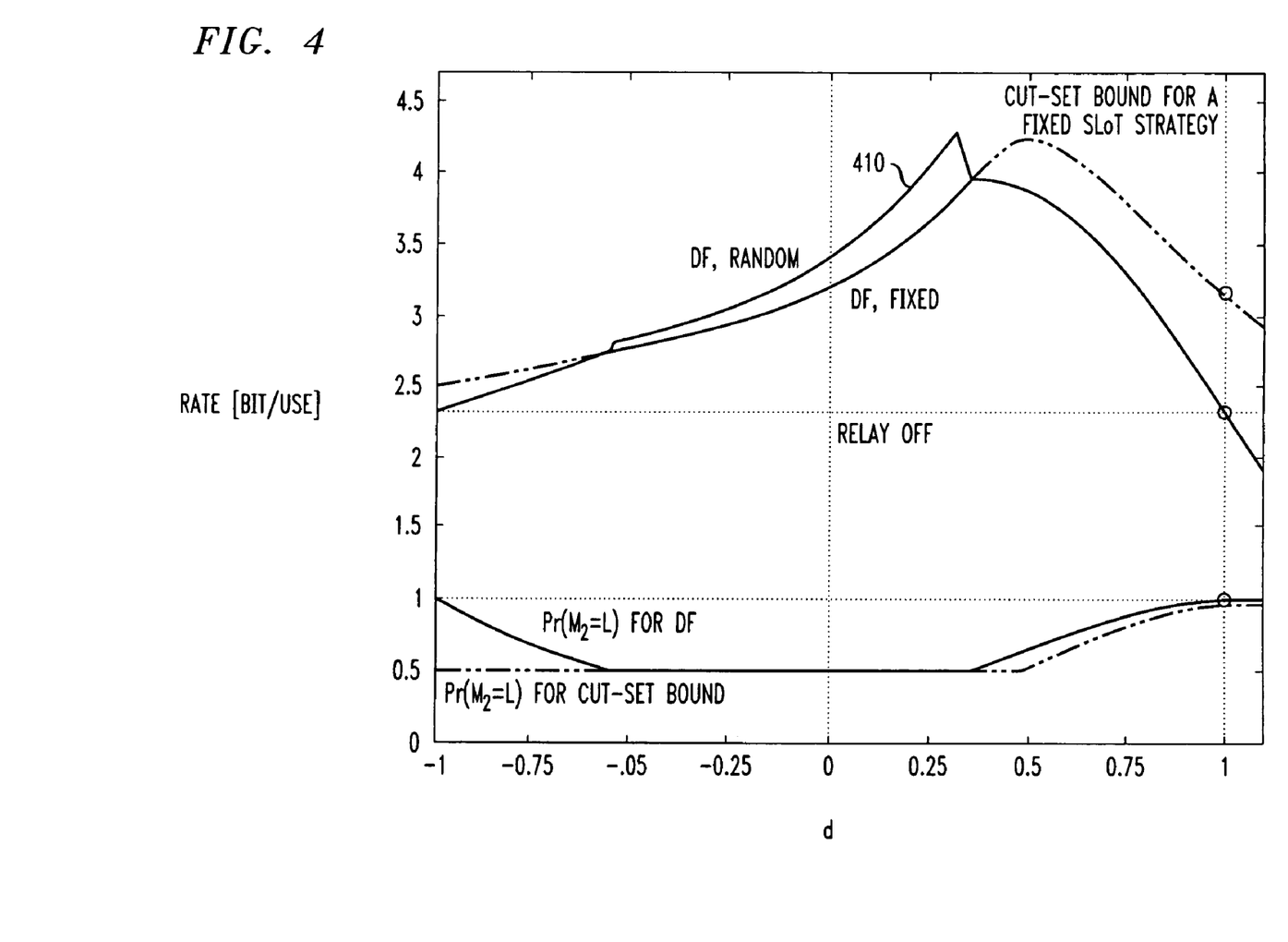
FIG. 4 illustrates a plot of rates for fixed and random SLoT strategies with no fading.

The DF rates are shown in FIG. 4 as the curve labeled "DF, fixed." The dash-dotted curve is the cut-set bound for a fixed SLoT strategy. It is computed as Equation (14) but with the first term inside the minimization of Equation (14) replaced by (see, e.g., Theorem 1 of Høst-Madsen, supra, or Khojastepour, et al., supra):

$$P_{M_2}(S)\log\left(1 + \frac{P_1}{d_{13}^\alpha}\right) + \\ P_{M_2}(L)\log\left(1 + \frac{P_1}{d_{12}^\alpha} + \frac{P_1}{d_{13}^\alpha}\right) + P_{M_2}(L)\log\left(1 + \frac{P_1(1 - |\rho|^2)}{d_{13}^\alpha}\right). \quad (17)$$

For the cut-set bound and $P_2(S) = P_2(L)$, any $M_2 = S$ symbol should again be made a $M_2 = L$ symbol, so $P_{M_2}(S) = \beta_2$. The lower curves in FIG. 4 show the optimizing $P_{M_2}(L)$ for both DF and the cut-set bound.

FIG. 4 exhibits several curious features. First, as a notable difference to Kramer, et al., "Capacity Theorems . . . ," supra, DF achieves capacity without fading if the relay is close to the source and if a fixed SLoT strategy is mandated. That is, DF achieves "capacity" for 0.55<d<0.36. Similar capacity results appear whenever $\gamma_2 > 0$. Second, the cut-set bound exhibits a sharp behavior near d=1. Third, the DF strategy should not be used if $|d| \geq 1$. Finally, it is apparent that the PDF strategy can improve on the DF strategy (see, e.g., Sankaranarayanan, et al., supra).

Suppose instead a random SLoT strategy as in FIG. 2 is used. For the geometry and parameters of Example 1, for every d the same distribution $P_{M_2 X_1 X_2}(\cdot)$ is chosen as for the "fixed" curve. This distribution is inserted into Equation (10), resulting in the following DF rate:

$$R = \min\left[P_{M_2}(L)\log\left(1 + \frac{P_1}{d_{12}^\alpha}\right), h(Y_3) - \log(\pi e)\right]. \quad (18)$$

The circular symmetry of $Y_3$ may be used to write:

$$h(Y_3) = \int_0^\infty -q(y)\log q(y) 2\pi y \, dy, \quad (19)$$

$$q(y) = \frac{P_{M_2}(S) + P_{M_2}(L)}{\pi \sigma_1^2} e^{-y^2/\sigma_1^2} + \frac{P_{M_2}(T)}{\pi \sigma_2^2} e^{-y^2/\sigma_2^2} \text{ and} \quad (20)$$

$$\sigma_1^2 = 1 + \frac{P_1}{d_{13}^\alpha}, \quad \sigma_2^2 = 1 + \frac{P_1}{d_{13}^\alpha} + \frac{P_2''(T)}{d_{23}^\alpha} + \frac{2\sqrt{P_1 P_2''(T)}}{d_{13}^{\alpha/2} d_{23}^{\alpha/2}}. \quad (21)$$

Turning now to FIG. 4, illustrated is a plot of rates for fixed and random SLoT strategies with no fading. The rates R are plotted in FIG. 4 as the uppermost curve 410 labeled "DF, random." As expected, $R \geq R_F$. Moreover, R is substantially larger than $R_F$ in the interesting region where the relay is near the source. Thus, transmission at rates beyond the "capacity" of the fixed SLoT strategy is possible.

It seems natural to suspect that DF achieves the true capacity of the relay channel defined by Equations (2) through (6), as long as the relay is near the source and $\gamma_2>0$. To prove this, one must show that the maximizing distribution $P_{M_2X_1W_2}(\bullet)$ for the cut-set bound set of Equation (8) is the same as the best $P_{M_2X_1X_2}(\bullet)$ for the DF rate given in Equation (10).

Consider again a fixed SLoT strategy, but now with phase fading. As in Høst-Madsen, supra, and Kramer, et al., "Capacity Theorems . . . ," supra, for the DF strategy it is best to choose Gaussian $X_1$ and $X_2$ that are statistically independent when conditioned on $M_1$ and $M_2$. The following rate results:

$$R_F = \min\left[P_{M_2}(L)\log\left(1+\frac{P_1}{d_{12}^\alpha}\right),\right.$$
$$\left.(P_{M_2}(S)+P_{M_2}(L))\log\left(1+\frac{P_1}{d_{13}^\alpha}\right)+P_{M_2}(T)\log\left(1+\frac{P_1}{d_{13}^\alpha}+\frac{P_2''(T)}{d_{23}^\alpha}\right)\right] \quad (22)$$

where $P_2''(T)$ is given by Equation (15). Note that Equation (22) is the same as Equation (14) with $\rho=0$. Suppose again that $P_2(S)=P_2(L)$, so that $P_{M_2}(S)=\beta_2$ is best. $P_{M_2}(L)$ is numerically optimized for the following second example.

Example 2

Consider the geometry of FIG. 3 and the system parameters:

$$\alpha=4, P_1=P_2=4, P_2^*=40\ P_2(S)=P_2(L)=P_2'(T)=-4,$$
$$\beta_2=0.5, \gamma=0.25. \quad (23)$$

That is, the relay can make $P_2''(T)$ as large as 40 while keeping its average power at $P_2=4$. The relay further collects energy in all modes, e.g., if it has a solar cell that refreshes energy. However, the relay must sleep for at least ½ of the time, and it must listen for at least ¼ of the time.

Figure 5:
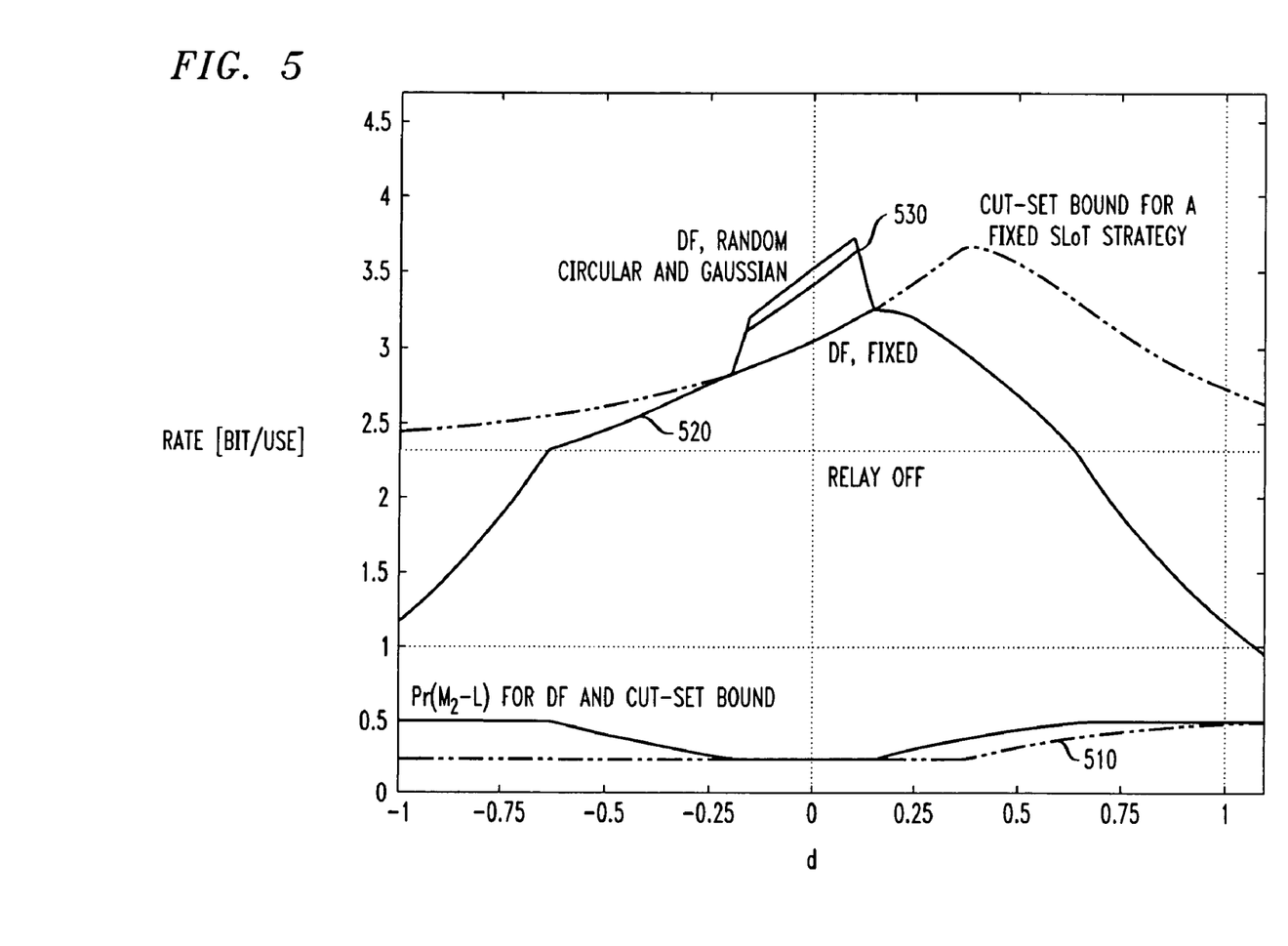
FIG. 5 illustrates a plot of rates for fixed and random SLoT strategies with phase fading.

Turning now to FIG. 5, illustrated is a plot of rates for fixed and random SLoT strategies with phase fading. $P_{M_2}(S)=\beta_2$ is best, and the optimum $P_{M_2}(L)$ are plotted as the lowermost curve 510 in FIG. 5. The DF rates are plotted as the curve 520 labeled "DF, fixed." The dash-dotted curve is the cut-set bound for a fixed SLoT strategy, and it is computed as Equation (22) but with the first logarithm in Equation (22) replaced by Equation (17) with $\rho=0$.

Note that DF again achieves the "capacity" for a fixed SLoT strategy if the relay is near the source ($-0.2<d<0.15$) and $\gamma_2>0$. The rates of FIG. 5 are not necessarily smaller than those in FIG. 4, even though $\rho=0$ and the relay must sleep or listen for a larger fraction of time than before. The reason for this behavior is that the relay can transmit with more power than before.

Random SLoT strategies will now be used for phase fading. For the parameters of Example 2, for every d the same distribution $P_{M_2X_1X_2}(\bullet)$ is chosen as for the "DF, fixed" curve. This distribution is inserted into Equation (10). The DF rate is given by Equations (18) through (20) and:

$$\sigma_1^2 = 1+\frac{P_1}{d_{13}^\alpha}, \quad \sigma_2^2 = 1+\frac{P_1}{d_{13}^\alpha}+\frac{P_2''(T)}{d_{23}^\alpha}. \quad (24)$$

The DF rate is plotted in FIG. 5 as the solid curve 530 above the "DF, fixed" curve 520 and below the uppermost solid curve. It is again apparent that a random SLoT strategy achieves larger rates than the fixed one in the interesting region where the relay is close to the source.

Suppose next that, for $M_2=T$, the Gaussian $X_2$ is replaced by $X_2=\sqrt{P_2''(T)}e^{j\phi_2}$ where $\phi_2$ is uniformly distributed over $[0,2\pi)$. This is called a "circular" distribution for $X_2$. The resulting DF rate is given by Equations (18), (19) and (24), and with Equation (20) replaced by:

$$q(y) = \frac{P_{M_2}(S)+P_{M_s}(L)}{\pi\sigma_1^2}e^{-y^2/\sigma_1^2} + \frac{P_{M_2}(T)}{\pi\sigma_1^2}e^{-(y^2+\sigma_2^2-\sigma_1^2)/\sigma_1^2}I_0\left(2y\frac{\sqrt{\sigma_2^2-\sigma_1^2}}{\sigma_1^2}\right) \quad (25)$$

where $I_0(\bullet)$ is the modified Bessel function of the first kind of order zero. The circular DF rate is plotted in FIG. 5 as the uppermost solid curve. Note that a non-Gaussian input distribution for $M_2=T$ achieves a larger rate than the Gaussian one. It again seems natural to suspect that DF achieves capacity as long as the relay is near the source and $\gamma_2>0$.

An important limitation of the model described above is that it assumes that the network operates synchronously. The transmitting terminals might therefore need to be symbol-synchronized. Unfortunately, this might be difficult to implement in wireless networks. However, as long as the signals are bandlimited, the DF and PDF strategies with independent $X_1$ and $X_2$ do not require symbol synchronization between terminals.

This statement is justified as follows. The filtered and sampled signal at the receiver contains sufficient statistics about the transmitted signals if the sampling rate is at or above the Nyquist rate. Further, both the DF and PDF strategies can be implemented with block-Markov encoders and joint decoders that can interpolate the $Y_{3i}$ sequences of different receive blocks. This should permit decoding at the rates of Equations (10) or (13).

All three DF curves in FIG. 5 have independent $X_1$ and $X_2$. It remains to be seen whether independent inputs are capacity-achieving for the phase fading models considered herein. (This currently known for models where the relay can transmit and receive at the same time and in the same frequency band, see, e.g., Kramer, et al., "Capacity Theorems . . . ," supra; Kramer, et al., "Cooperative Strategies . . . ," supra; and Wang, et al., supra.)

Figure 6:
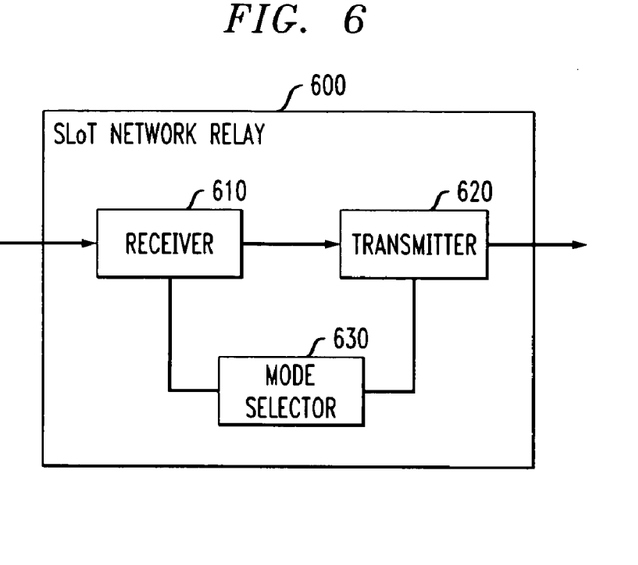
FIG. 6 illustrates a block diagram of one embodiment of a SLoT network relay having dynamically selectable receive and transmit channel intervals and constructed according to the principles of the present invention.

Having described the theoretical underpinnings of a network relay having superior performance to those of the prior art, associated apparatus and methods can now be described. Accordingly, turning now to FIG. 6, illustrated is a block diagram of one embodiment of a SLoT network relay, generally designated 600, having dynamically selectable receive and transmit channel intervals and constructed according to the principles of the present invention. The network relay 600 may be coupled to a wireline network or a wireless network.

The SLoT network relay 600 includes a receiver 610. The receiver 610 is configured to receive one or more symbols transmitted by a source (not shown, but indicated by the arrow pointing toward the receiver 610) in each of a first sequence of fundamental intervals.

The SLoT network relay 600 further includes a transmitter 620 coupled to the receiver 610. The transmitter is configured to transmit data extracted from the received ones of the symbols to a destination in each of a second sequence of fundamental intervals. The fundamental intervals of the first and second sequences interleave to make a continuous period of time.

The SLoT network relay 600 further includes a mode selector 630 coupled to the receiver 610 and the transmitter 620. The mode selector 630 is configured to select, for each particular one of the fundamental intervals, between activating the receiver and activating the transmitter based on one or more of the symbols received in an associated recent one of the fundamental intervals. In the illustrated embodiment, the mode selector 630 is configured such that times between immediately successive ones of the fundamental intervals of the second sequence vary in length. In the illustrated embodiment, each of the associated recent one of the fundamental intervals is an interval within a hundred (and more specifically within ten) intervals before the associated each particular one of the fundamental intervals.

In one embodiment the transmitter 620 is further configured to transmit a value representing a coarse-grained de-quantization value of the ones of the received ones of the symbols transmitted. In the illustrated embodiment, the mode selector 630 is embodied in part in a sequence of executable software instructions. However, the mode selector 630 may alternatively be embodied in hardware or a combination of software, firmware or hardware.

Figure 7:
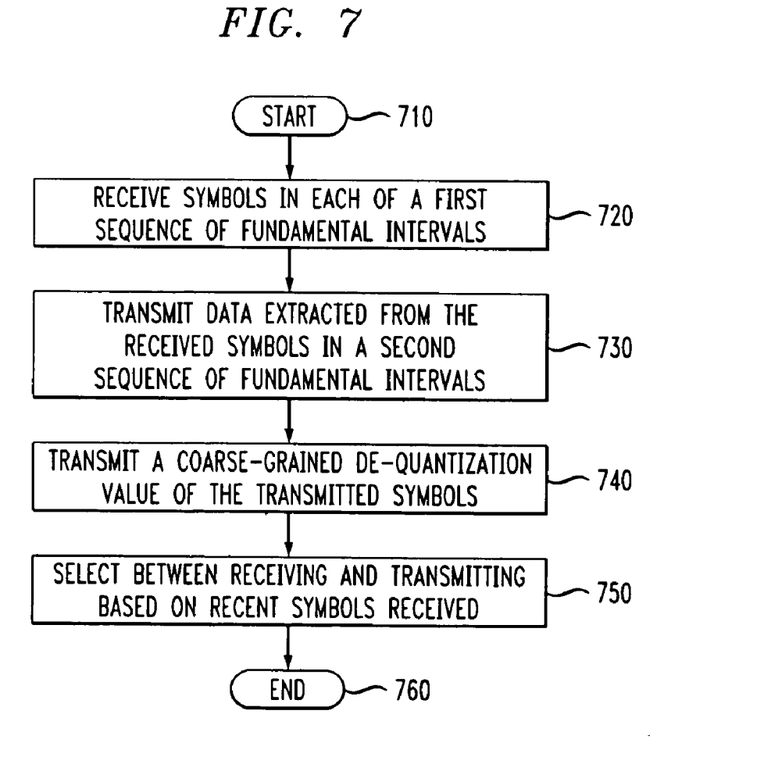
FIG. 7 illustrates a flow diagram of one embodiment of a method of operating a network relay or a transmitter (which may be part of a network relay) carried out according to the principles of the present invention.

Turning now to FIG. 7, illustrated is a flow diagram of one embodiment of a method of operating a network relay or a transmitter (which may be part of a network relay) carried out according to the principles of the present invention.

The method begins in a start step 710 wherein it is desired to improve the utilization of a channel by means of adopting a dynamic random SLoT strategy. In a step 720, one or more symbols transmitted by a source are received at a relay in each of a first sequence of fundamental intervals.

In a step 730, data extracted from the received ones of the symbols are transmitted from the relay to a destination in each of a second sequence of fundamental intervals. The fundamental intervals of the first and second sequences interleave to make a continuous period of time.

In an optional step 740, a value is transmitted, the value representing a coarse-grained de-quantization value of the ones of the received ones of the symbols transmitted.

In a step 750, for each particular one of the fundamental intervals, a selection is made between performing the receiving and performing the transmitting. The selection is made based on one or more of the symbols received in an associated recent one of the fundamental intervals. The method ends in an end step 760.

Although the present invention has been described in detail, those skilled in the art should understand that they can make various changes, substitutions and alterations herein without departing from the spirit and scope of the invention in its broadest form.

What is claimed is:

1. A method of operating a relay, comprising:
   at a relay unable to simultaneously receive and retransmit over a channel, receiving one or more symbols transmitted by a source in each of a first sequence of fundamental intervals, wherein said fundamental intervals are receive and transmit channel intervals of said relay;
   from said relay, transmitting data extracted from said received ones of said symbols to a destination in each of a second sequence of fundamental intervals, said fundamental intervals of said first and second sequences interleaving to make a continuous period of time; and
   dynamically determining for each particular one of said fundamental intervals, between either performing said receiving or performing said transmitting based on one or more of said symbols received in an associated recent one of said fundamental intervals.

2. The method as recited in claim 1 wherein said dynamically determining is such that times between immediately successive ones of said fundamental intervals of said second sequence vary in length.

3. The method as recited in claim 1 wherein each of said associated recent one of said fundamental intervals is an interval within a hundred intervals before said associated each particular one of said fundamental intervals.

4. The method as recited in claim 1 wherein said transmitting comprises transmitting a value representing a coarse-grained de-quantization value of said ones of said received ones of said symbols transmitted.

5. The method as recited in claim 1 wherein said transmitting comprises transmitting across a wireline network.

6. The method as recited in claim 1 wherein said transmitting comprises transmitting across a wireless network.

7. The method as recited in claim 1 wherein said selecting is carried out by a sequence of executable software instructions.

8. A method of operating a transmitter, comprising:
   during a first sequence of fundamental intervals, transmitting symbols to a relay for transmitting from said relay to a destination, wherein said fundamental intervals are receive and transmit channel intervals of said relay that are dynamically selectable to either receive or transmit;
   during a second sequence of fundamental intervals, waiting to transmit symbols to said relay, said fundamental intervals of said first and second sequences interleaving to make a continuous period of time; and
   for each particular one of said fundamental intervals, dynamically determining between either performing said transmitting or performing said waiting based on one or more of said symbols transmitted in an associated recent one of said fundamental intervals.

9. The method as recited in claim 8 wherein said dynamically determining is such that times between immediately successive ones of said fundamental intervals of said first sequence vary in length.

10. The method as recited in claim 8 wherein each of said associated recent one of said fundamental intervals is one of said intervals within said ten of said intervals that precede said associated each particular one of said fundamental intervals.

11. A sleep-listen-or-talk network relay having a channel for receiving and transmitting, comprising:
    a receiver configured to receive one or more symbols transmitted by a source in each of a first sequence of fundamental intervals, wherein said fundamental intervals are receive and transmit intervals of said channel;
    a transmitter associated with said receiver and configured to transmit data extracted from said received ones of said symbols to a destination in each of a second sequence of fundamental intervals, said fundamental intervals of said first and second sequences interleaving to make a continuous period of time; and
    a mode selector associated with said receiver and said transmitter and configured to dynamically determine, for each particular one of said fundamental intervals, between either activating said receiver or activating said transmitter based on one or more of said symbols received in an associated recent one of said fundamental intervals.

12. The network relay as recited in claim 11 wherein said mode selector is configured such that times between immediately successive ones of said fundamental intervals of said second sequence vary in length.

13. The network relay as recited in claim 11 wherein each of said associated recent one of said fundamental intervals is an interval within a hundred intervals before said associated each particular one of said fundamental intervals.

14. The network relay as recited in claim 11 wherein said transmitter is further configured to transmit a value representing a coarse-grained de-quantization value of said ones of said received ones of said symbols transmitted.

15. The network relay as recited in claim 11 wherein said network relay is coupled to a wireline network.

16. The network relay as recited in claim 11 wherein said network relay is coupled to a wireless network.

17. The relay as recited in claim 11 wherein said mode selector is embodied in part in a sequence of executable software instructions.

18. A transmitter configured to:
   transmit symbols to a relay for transmitting from said relay to a destination, said relay having a channel with fundamental intervals that are dynamically selectable receive and transmit intervals, said transmitter configured to transmit said symbols during a first sequence of said fundamental intervals;
   during a second sequence of fundamental intervals, wait to transmit symbols to said relay, said fundamental intervals of said first and second sequences interleaving to make a continuous period of time; and
   for each particular one of said fundamental intervals, dynamically determining between either performing said transmitting or performing said waiting based on one or more of said symbols transmitted in an associated recent one of said fundamental intervals.

19. The relay as recited in claim 18 wherein said transmitter is further configured to dynamically determine such that times between immediately successive ones of said fundamental intervals of said first sequence vary in length.

20. The relay as recited in claim 18 wherein each of said associated recent one of said fundamental intervals is one of said intervals within said ten of said intervals that precede said associated each particular one of said fundamental intervals.

* * * * *